United States Patent
Ishizeki et al.

(10) Patent No.: US 9,564,848 B2
(45) Date of Patent: Feb. 7, 2017

(54) POWER CONVERTER

(71) Applicant: DAIKIN INDUSTRIES, LTD., Osaka-shi, Osaka (JP)

(72) Inventors: Shinichi Ishizeki, Osaka (JP); Kentarou Taoka, Osaka (JP); Masahide Fujiwara, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/023,924

(22) PCT Filed: Aug. 27, 2014

(86) PCT No.: PCT/JP2014/004396
§ 371 (c)(1),
(2) Date: Mar. 22, 2016

(87) PCT Pub. No.: WO2015/056390
PCT Pub. Date: Apr. 23, 2015

(65) Prior Publication Data
US 2016/0248365 A1    Aug. 25, 2016

(30) Foreign Application Priority Data
Oct. 16, 2013 (JP) ................................. 2013-215241

(51) Int. Cl.
*H02P 1/24* (2006.01)
*H02P 27/06* (2006.01)
(Continued)

(52) U.S. Cl.
CPC ................ *H02P 27/06* (2013.01); *H02M 1/36* (2013.01); *H02M 1/4225* (2013.01); *H02M 5/44* (2013.01);
(Continued)

(58) Field of Classification Search
CPC ................. H02P 23/26; H02P 2201/15; H02M 2003/1586; H02M 1/42; H02M 1/4208
(Continued)

(56) References Cited

U.S. PATENT DOCUMENTS 8,698,468 B2 * 4/2014 Yamane .................. H02M 1/32
323/282
8,994,343 B2 * 3/2015 Ohshita ............... H02M 3/1584
323/225
(Continued)

FOREIGN PATENT DOCUMENTS

JP      2003-79050 A    3/2003
JP      2009-124912 A   6/2009
(Continued)

*Primary Examiner* — Eduardo Colon Santana
*Assistant Examiner* — Bickey Dhakal
(74) *Attorney, Agent, or Firm* — Birch, Stewart, Kolash & Birch, LLP

(57) ABSTRACT

Reduced is occurrence of hunting in which a power factor corrector continuously turns on and off alternately for a short period of time. A power factor correction controller turns on a power factor corrector if a parameter value for an input current into the power factor corrector is greater than or equal to a first threshold, and turns off the power factor corrector if the parameter value is smaller than or equal to a second threshold below the first threshold. Through a predetermined time period from a moment when the power factor corrector is switched either from on to off or from off to on, the power factor correction controller maintains a state of the switched power factor corrector, regardless of the parameter value.

8 Claims, 7 Drawing Sheets

(51) Int. Cl.
*H02M 1/36* (2007.01)
*H02M 1/42* (2007.01)
*H02M 5/44* (2006.01)
*H02M 7/06* (2006.01)
H02M 3/157 (2006.01)
H02M 3/158 (2006.01)
F24F 11/00 (2006.01)

(52) U.S. Cl.
CPC ......... *H02M 7/06* (2013.01); *F24F 2011/0083* (2013.01); *H02M 3/157* (2013.01); *H02M 2003/1586* (2013.01); *Y02B 70/126* (2013.01)

(58) Field of Classification Search
USPC .................................................. 318/729, 438
See application file for complete search history.

(56) References Cited

U.S. PATENT DOCUMENTS

| | | | | |
|---|---|---|---|---|
| 9,178,413 | B2* | 11/2015 | Huynh | ................ H02M 1/4225 |
| 2003/0222633 | A1* | 12/2003 | Hwang | ................... H02M 1/36 |
| | | | | 323/282 |
| 2009/0141523 | A1 | 6/2009 | Sugawara | |
| 2013/0043846 | A1* | 2/2013 | Murdock | ............ H02M 1/4225 |
| | | | | 323/205 |

FOREIGN PATENT DOCUMENTS

| | | |
|---|---|---|
| JP | 2010-124690 A | 6/2010 |
| JP | 2011-239547 A | 11/2011 |

\* cited by examiner

| STATE OF POWER FACTOR CORRECTOR (25) | | CURRENT CONVERSION EXPRESSION | | PARAMETER VALUE | |
|---|---|---|---|---|---|
| BEFORE SWITCHING | AFTER SWITCHING | BEFORE SWITCHING | AFTER SWITCHING | BEFORE SWITCHING | AFTER SWITCHING |
| OFF | ON | PF_off | PF_on | 12A | 6A |
| ON | OFF | PF_on | PF_off | 4A | 8A |

US 9,564,848 B2

POWER CONVERTER

TECHNICAL FIELD

The present invention relates to a power converter and, in particular, a technique to reduce hunting occurring when a power factor corrector turns on and off.

BACKGROUND ART

Compressors in air conditioners are powered by a motor working as a drive source. The motor is driven by alternating-current (AC) power supplied from a power converter.

A typical power converter mainly includes a rectifier, a booster-type power factor corrector, and an inverter power converter, as disclosed in Patent Document 1. First, the rectifier rectifies an AC commercial voltage output from a commercial power source. The rectified voltage is boosted to a desired voltage and smoothed by the power factor corrector, so that the power factor of the voltage is corrected to improve. The voltage with the power factor corrected is supplied to the power converter. Using the voltage with the power factor corrected, the power converter generates AC power for driving the motor.

CITATION LIST

Patent Document

Patent Document 1: Japanese Unexamined Patent Publication No. 2011-239547

SUMMARY OF THE INVENTION

Technical Problem

The on-off control of a power factor corrector is performed by a controller including, for example, a central processing unit (CPU). The controller turns the power factor corrector on or off, depending on, for example, the magnitude of a parameter value obtained based on an input current into the power factor corrector. Under some conditions, however, the controller could transitionally fail to recognize in time the state of a power factor at present, immediately after the on-off switching of the power factor corrector. Such a failure would result in the occurrence of hunting; that is, the power factor corrector continuously turns on and off alternately for a short period of time. This hunting could cause disturbance in a waveform of a current flowing through the power factor corrector, and the resulting abnormal noise from a reactor in the power factor corrector.

In view of the foregoing background, it is therefore an object of the present invention to reduce the occurrence of the hunting.

Solution To The Problem

A first aspect of the present disclosure comprises: a rectifier (22) configured to rectify an input alternate current (AC) from an AC power source (91); a power factor corrector (25) configured to perform a power factor correction operation on an input voltage (V1) output from the rectifier (22); a power converter (28) connected to an output of the power factor corrector (25), and configured to generate output AC power (SU, SV, SW); and a controller (31g) configured to control the power factor correction operation by the power factor corrector (25). The controller (31g) is configured to (i) turn on the power factor corrector (25) and cause the power factor corrector (25) to perform the power factor correction operation if a parameter value for input into or output from the power factor corrector (25) is greater than or equal to a first threshold, and (ii) turn off the power factor corrector (25) and cause the power factor corrector (25) to stop the power factor correction operation if the parameter value is smaller than or equal to a second threshold below the first threshold; and, through a predetermined time period (Tg) from a moment when the power factor corrector (25) is switched either from on to off, or from off to on, the controller (31g) is configured to maintain a state of the switched power factor corrector (25) regardless of the parameter value.

According to the first aspect of the present disclosure, when the power factor corrector (25) is switched from on to off, the power factor corrector (25) is maintained off through the predetermined time period (Tg) from the moment of the switching. To the contrary, when the power factor corrector (25) is switched from off to on, the power factor corrector (25) is maintained on through the predetermined time period (Tg) from the moment of the switching. Thus, through the predetermined time period (Tg) from the moment when the state of the power factor corrector (25) is switched, the hunting—the power factor corrector (25) is continuously turns on and off alternately—may be reduced.

In the first aspect, the controller (31g) in a second aspect of the present disclosure may be configured to stop maintaining the state of the switched power factor corrector (25) after the predetermined time period (Tg) has elapsed.

According to the second aspect, after the predetermined time period (Tg) has elapsed, the power factor corrector (25) may be switched either from off to on, or from on to off, based on the magnitude relationship among the parameter value and the two thresholds (i.e., the first and second thresholds, specifically).

In the second aspect, a detector (29) in a third aspect of the present disclosure may be configured to detect the input into or the output from the power factor corrector (25) for a predetermined period (Ts). The predetermined time period (Tg) may be longer than the predetermined period (Ts).

According to the third aspect, after the predetermined time period (Tg) has elapsed, the power factor corrector (25) is switched between on and off based on a latest parameter value for the input into or output from the power factor corrector (25). Here, the input or output is detected during the predetermined time period (Tg). Hence, after the predetermined time period (Tg) has elapsed, the power factor corrector (25) is correctly switched between on and off based on the latest parameter value, and the occurrence of the hunting after the predetermined time period (Tg) has elapsed is reliably reduced.

In the third aspect, the detector (29) in a fourth aspect of the present disclosure may be a current detector detecting an input current (Im) into the power factor corrector (25).

In any one of the first to third aspects, the parameter value in a fifth aspect of the present disclosure may be a value for input power into or output power from the power factor corrector (25).

A sixth aspect of the present disclosure provides an air conditioner including the power converter (20) of any one of the first to the fifth aspects.

Advantages Of The Invention

According to the first, fourth and sixth aspects of the present disclosure, the hunting—the power factor corrector

(25) is continuously turns on and off alternately—may be reduced through the predetermined time period (Tg) from the moment when the state of the power factor corrector (25) is switched.

According to the second aspect, after the predetermined time period (Tg) has elapsed, the power factor corrector (25) is switched either from off to on or from on to off, based on the magnitude relationship among the parameter value and the two thresholds (i.e., the first and second thresholds, specifically).

According to the third aspect, after the predetermined time period (Tg) has elapsed, the power factor corrector (25) is correctly switched between on and off based on the latest parameter value, and the occurrence of the hunting after the predetermined time period (Tg) has elapsed is reliably reduced.

DESCRIPTION OF EMBODIMENTS

Described hereinafter are embodiments of the present invention, with reference to the drawings. Note that the embodiments are essentially preferable examples, and are not intended to limit the scopes of the present invention, of the application of the present invention, or of the use of the present invention.

<<First Embodiment>>
<Outline>

Figure 1:
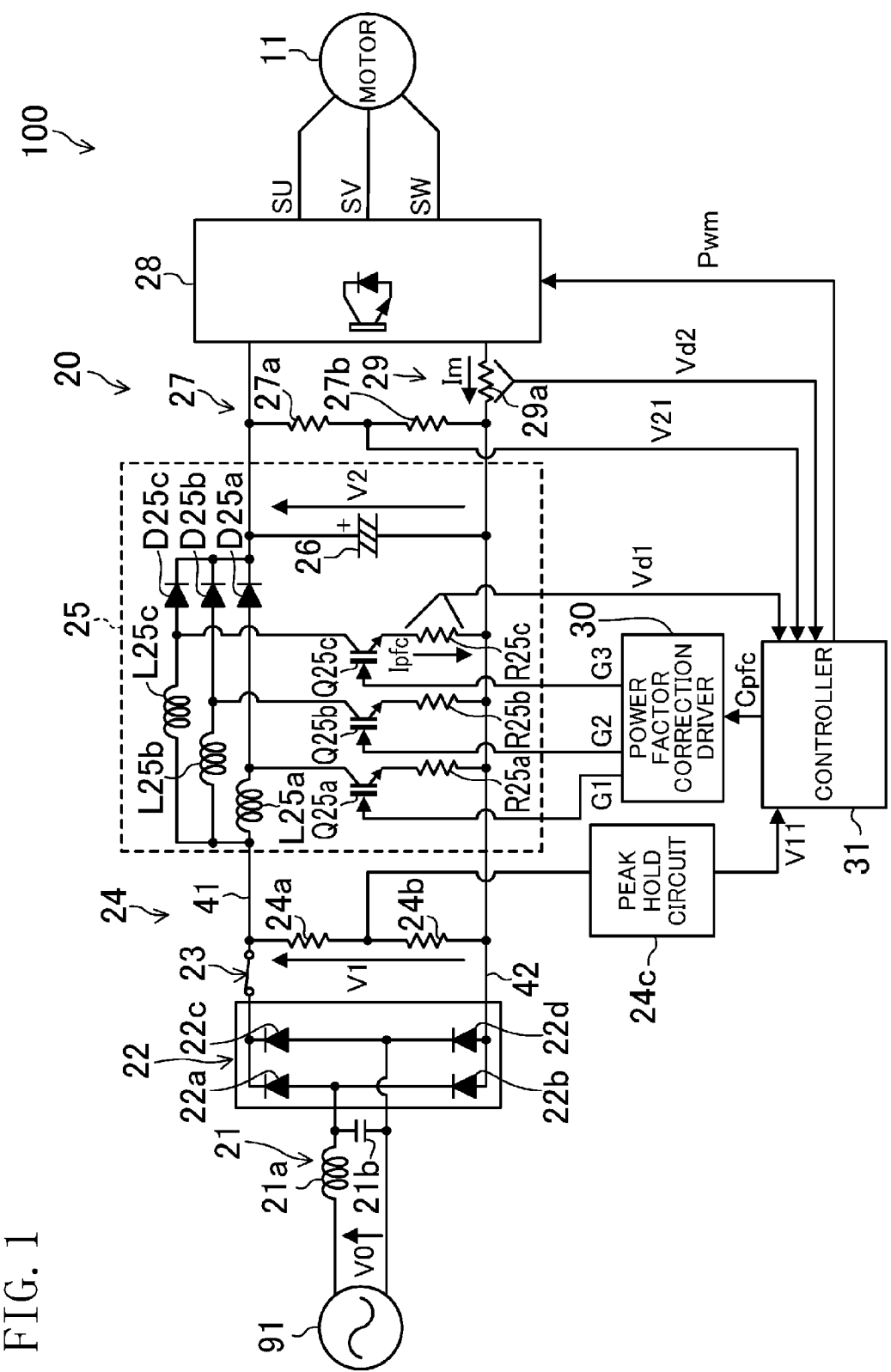
FIG. 1 is a block diagram of a motor driving system including a power converter.

FIG. 1 is a block diagram of a motor driving system (100) including a power converter (20) according to the first embodiment. The motor driving system (100) of FIG. 1 includes a motor (11) and the power converter (20).

The motor (11) is a three-phase brushless motor. Although not shown, the motor (11) includes, for example, a stator, a rotor, and a hall effect sensor. The stator includes multiple drive coils. The rotor includes a permanent magnet. The hall effect sensor is used to detect a position of the rotor with respect to the stator.

Figure 7:
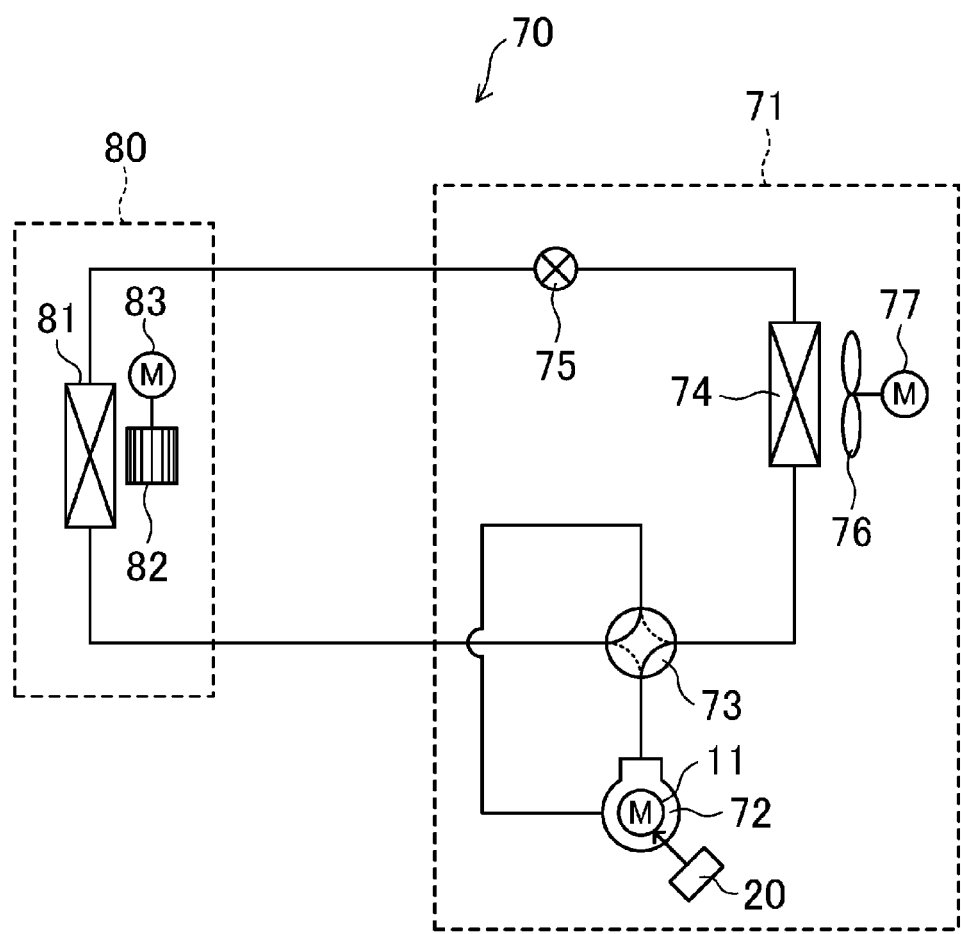
FIG. 7 is a general diagram illustrating a configuration of an air conditioner.

Note that the motor (11) according to this first embodiment is a drive source for a compressor (72) included in an air conditioner (70) in FIG. 7. FIG. 7 is a diagram illustrating a refrigerant circuit configured by the outdoor unit (71) and the indoor unit (80). The outdoor unit (71) includes: a motor (11); a compressor (72) which compresses a refrigerant; a four-way switching valve (73) which switches a flow of the refrigerant; an outdoor heat exchanger (74) which exchanges heat between the refrigerant and outdoor air; an expansion valve (75) which decompresses the refrigerant; an outdoor fan (76) which supplies the outdoor air to the outdoor heat exchanger (74), and a fan motor (77). An indoor unit (80) includes: an indoor heat exchanger (81) which exchanges heat between the refrigerant and indoor air; an indoor fan (82) which blows the air after the heat exchange into the room; and a fan motor (83).

The power converter (20) is connected to the motor (11) and a commercial power source (91) via multiple harnesses. The power converter (20) converts an input AC power, provided from the commercial power source (91), into an output AC power (SU, SV, SW), and supplies the converted output AC power to the motor (11). Here, the commercial power source (91) is an AC power source. Such features enable the motor (11) to run.

Note that the first embodiment presents, as an example, a case where the commercial power source (91) is a single-phase power source.

<Configuration of Power Converter>

The power converter (20) mainly includes: a filter (21); a rectifier (22); a main power source relay (23); an input voltage detector (24); a power factor corrector (25); an output voltage detector (27); a power converter (28); a current detector (29) acting as a detector; a power factor correction driver (30); and a controller (31).

—Filter—

The filter (21) is located between the commercial power source (91) and the rectifier (22). The filter (21) is a low-pass filter including a coil (21a) and a capacitor (21b), and reduces high-frequency noise, generated by the power factor corrector (25) and the power converter (28), accidentally entering the commercial power source (91).

—Rectifier—

The rectifier (22) is connected to a stage subsequent to the filter (21). The rectifier (22) includes four diodes (22a, 22b, 22c, 22d).

Specifically, cathode terminals of the diodes (22a 22c) are connected to a power source line (41). Anode terminals of the diodes (22b, 22d) are connected to a GND line (42). A connecting point between the anode terminal of the diode (22a) and the cathode terminal of the diode (22b) and another connecting point between the anode terminal of the diode (22c) and the cathode terminal of the diode (22d) are each connected to a different one of outputs of the commercial power source (91).

Figure 2:
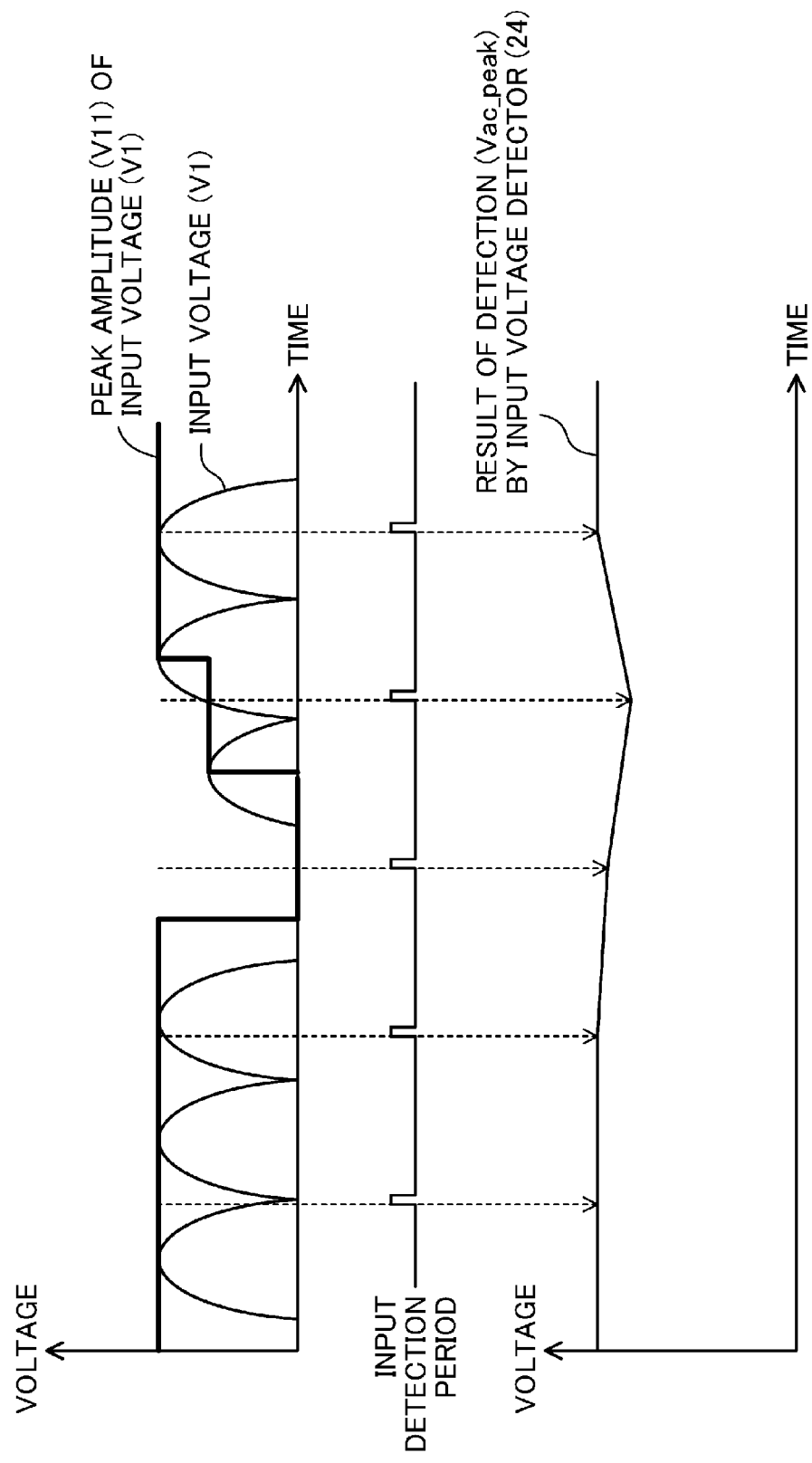
FIG. 2 is a timing diagram illustrating temporal changes in: input voltage; peak amplitude of the input voltage; input detection period; and result of detection by an input voltage detector.

As illustrated in FIG. 2, the rectifier (22) performs full-wave rectification on an input AC from the commercial power source (91), and outputs the rectified input AC.FIG. 2 illustrates temporal changes in: rectified voltage (i.e., an input voltage) (V1); peak amplitude (V11) of the input voltage (V1); input detection period to be discussed later; and result of detection (Vac_peak) by the input voltage detector (24).

For the sake of description, the voltage of the input AC is hereinafter referred to as a "commercial voltage (V0)".

—Main Power Source Relay—

The main power source relay (23) is connected in series, on the power source line (41), between the rectifier (22) and the power factor corrector (25). The main power source relay (23) is a normally closed contact. The main power source relay (23) is opened to shut down the supply of power from the commercial power source (91) to the motor (11), in the case where, for example, the motor (11) has to stop driving urgently.

Examples of such a case include the cases where the compressor (72) generates abnormally high pressure and the motor (11) receives an excessively large amount of current.

Note that the main power source relay (23) may be positioned at a stage prior to the rectifier (22), instead of a stage subsequent to the rectifier (22).

—Input Voltage Detector—

The input voltage detector (24) detects the voltage (V1) output from the rectifier (22) as the input voltage to the power factor corrector (25).

Figure 3:
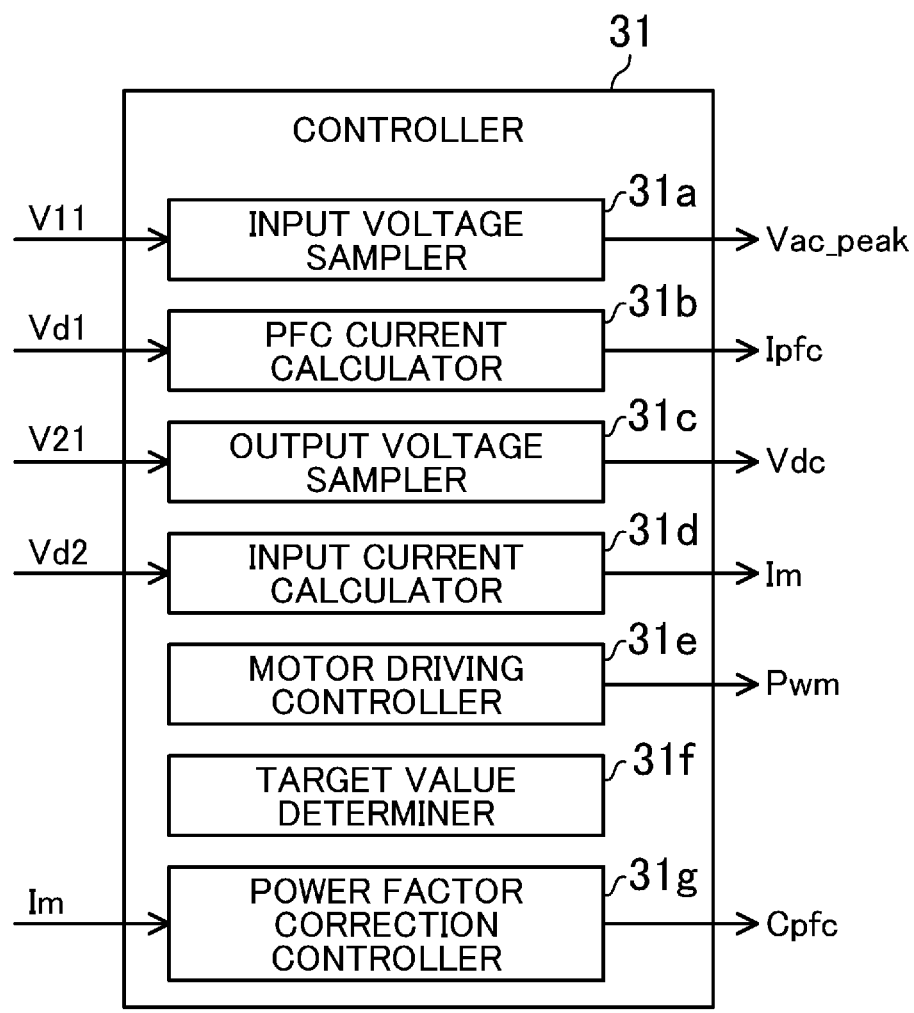
FIG. 3 is a schematic diagram illustrating functional units of a controller.

Specifically, as illustrated in FIGS. 1 and 3, the input voltage detector (24) mainly includes: two resistors (24a, 24b) connected to each other in series; a peak hold circuit (24c), and the controller (31) functioning as an input voltage sampler (31a). The two resistors (24a, 24b) are provided between the main power source relay (23) and the power factor corrector (25), and connected across the output of the rectifier (22). A voltage value at the connecting point between the resistors (24a, 24b) is input into the peak hold circuit (24c). As illustrated in FIG. 2, the peak hold circuit (24c) holds a peak amplitude (V11), representing the maximum value of a rectified voltage (i.e., the input voltage) (V1), for a certain period of time. This peak amplitude (V11) is input into the controller (31), sampled and converted from analogue to digital by the input voltage sampler (31a) for an input detection period as illustrated in FIG. 2, and identified by the input voltage detector (24) as the result of detection (Vac_peak).

Here, FIG. 3 schematically illustrates functional units of the controller (31) according to the first embodiment.

Moreover, FIG. 2 illustrates a case where an input detection period, representing a detection period of the input voltage detector (24), is longer than a period in which the input voltage (V1) reaches the maximum value (i.e., power frequency).

—Power Factor Corrector—

As illustrated in FIG. 1, the power factor corrector (25) is connected across the outputs of the rectifier (22) at a stage subsequent to the main power source relay (23). The power factor corrector (25) is a booster-type power factor correction circuit, and performs a power factor correction operation by boosting and smoothing the input voltage (V1).

Specifically, the power factor corrector (25) according to the first embodiment includes a three-phase boost converter and a smoothing capacitor (26). Here, the boost converter is a three-phase interleaved converter. More specifically, the power factor corrector (25) includes three reactors (L25a, L25b, L25c), three switching devices (Q25a, Q25b, Q25c), three resistors (R25a, R25b, R25c), three diodes (D25a, D25b, D25c), and one smoothing capacitor (26).

The reactor (L25a) is connected in series on the power source line (41). Using the input voltage (V1) as electrical energy, the reactor (L25a) converts the input voltage (V1) into magnetic flux energy and stores the magnetic flux energy. An inductance value of the reactor (L25a) is appropriately determined based on, for example, a value of current flowing through the power source line (41), and a switching frequency of the switching device (Q25a).

The switching device (Q25a) is an n-ch insulated gate bipolar transistor, and connected in parallel to the reactor (L25a). The switching device (Q25a) switches between accumulation and discharge of the energy, based on the input voltage (V1), in and out of the reactor (L25a). The on and off of the switching device (Q25a) is controlled by the power factor correction driver (30).

The resistor (R25a) is a shunt resistor for detecting a PFC current (Ipfc) flowing through the switching device (Q25a), and connected between the switching device (Q25a) and the GND line (42). A voltage (Vd1) across the resistor (R25a) is converted from analogue to digital, and then input into the controller (31) functioning as a PFC current calculator (31b) as seen in FIG. 3. The voltage (Vd1) is used for calculating the PFC current (Ipfc). The PFC current (Ipfc) is used for controlling the drive of the power factor corrector (25). This is to supply stable energy to a stage subsequent to the power factor corrector (25) even if the output voltage (V2) fluctuates to some degree. A resistance of the resistor (R25a) is determined to be an appropriate value which does not hinder an operation by the power factor corrector (25) to boost a voltage.

Note that, in FIG. 1, the voltage (Vd1) across the resistor (R25c) alone is input into the controller (31). The voltages (Vd1) across the resistors (R25a, R25b) are also input into the controller (31).

The diode (D25a) is provided close to an output of the reactor (L25a), and connected in series on the power source line (41). Specifically, the diode (D25a) has an anode terminal provided more downstream in current flow direction than a connecting point between the reactor (L25a) and the switching device (Q25a). The diode (D25a) allows the current to flow only from the reactor (L25a) toward the power converter (28).

The smoothing capacitor (26) is, for example, an electrolytic capacitor. One smoothing capacitor (26) is provided in common to the boost converters for all the phases. The smoothing capacitor (26) is provided close to the outputs of the reactors (L25a, L25b, L25c), and connected in parallel to the switching devices (Q25a, Q25b, Q25c). The smoothing capacitor (26) generates a direct-current (DC) voltage having a relatively low ripple component, by charging itself with energy released from the reactors (L25a, L25b, L25c) and discharging the energy from itself.

Such a boosting operation (i.e., the power factor correction operation) by the power factor corrector (25) is described, with reference to a boost converter for one phase as an example. First, when the switching device (Q25a) turns on, a current path is formed in the order of the power source line (41), the reactor (L25a), the switching device (Q25a), the resistor (R25a), and the GND line (42). The PFC current (Ipfc) flows in this order. Next, the PFC current (Ipfc) flows into the reactor (L25a) such that the reactor (L25a) is charged with the energy. Then, when the switching device (Q25a) turns off, the current path is cut off by the switching device (Q25a). Accordingly, a current equivalent to the amount of the energy stored into the reactor (L25a) flows through the diode (D25a) into the smoothing capacitor (26). Through the repetition of this operation, the voltage across the smoothing capacitor (26) increases.

Note that the boost converters for the other two phases are connected in parallel to the boost converter for the one phase, and the operations of the former converters are similar to the operation of the latter converter.

The number of the constituent elements such as the reactors (L25a, L25b, L25c) in the power factor corrector (25) is an example, and shall not be limited as described above. Moreover, instead of the resistors (R25a, R25b, R25c), a current sensor may detect the PFC currents (Ipfc).

—Output Voltage Detector—

The output voltage detector (27) detects the output voltage (V2).

As illustrated in FIGS. 1 and 3, the output voltage detector (27) mainly includes: two resistors (27a, 27b) connected in series to each other; and the controller (31) functioning as an output voltage sampler (31c). The two resistors (27a, 27b) are provided between the power factor corrector (25) and the power converter (28), and connected across the rectifier (22). A voltage (V21) at a connecting point between the resistors (27a, 27b) is input into the controller (31), sampled and converted from analogue to digital by the output voltage sampler (31c) for an output detection period, and identified by the output voltage detector (27) as the result of the detection (Vdc) of the output voltage (V2).

Note that the output detection period may be either shorter than or equal to the input detection period that is a period of detection by the input voltage detector (24).

—Power Converter—

The power converter (28) is connected to an output of the power factor corrector (25) in parallel to the reactors (L25a, L25b, L25c). When receiving the output voltage (V2) from the power factor corrector (25), the power converter (28) generates the output AC power (SU, SV, SW).

The power converter (28) includes an inverter circuit and an inverter driver neither of which is not shown. The inverter circuit includes, for example, two or more of the following: power devices each of which is an insulated gate bipolar transistor; and freewheeling diodes each connected in inverse-parallel to a corresponding one of the power devices. The inverter driver is, for example, an integrated circuit, and connected to a gate terminal of each power device. Based on a motor control signal (Pwm) to be output from the controller (31), the inverter driver controls the application of a gate voltage to each power device to turn on and off the power device, and causes the inverter circuit to generate the output AC power (SU, SV, SW).

—Current Detector—

The current detector (29) detects a value of an input current (Im) flowing to the power factor corrector (25). The input current (Im) flows from the commercial power source (91) through the power source line (41), and the power converter (28), into the motor (11). The input current (Im) then flows again to the power converter (28), through the GND line (42), into the power factor corrector (25).

As illustrated in FIGS. 1 and 3, the current detector (29) mainly includes, for example, a shunt resistor (29a) connected in series on the GND line (42), and the controller (31) functioning as an input current calculator (31d). A voltage (Vd2) across the shunt resistor (29a) is input into the controller (31), and sampled and converted from analogue to digital by the input current calculator (31d) for a predetermined sampling period (equivalent to a predetermined period). The voltage (Vd2) is used for the calculation of the input current (Im).

—Power Factor Correction Driver—

The power factor correction driver (30) is connected to the controller (31) and the gate terminals of the switching devices (Q25a, Q25b, Q25c). The power factor correction driver (30) is, for example, an integrated circuit. Based on the PFC drive instruction signal (Cpfc) from the controller (31), the power factor correction driver (30) controls the application of a gate voltage to each of the switching devices (Q25a, Q25b, Q25c) to turn on and off the power factor corrector (25).

Specifically, when turning on the power factor corrector (25) for the power factor correction operation, the power factor correction driver (30) outputs gate control signals (G1, G2, G3) to the respective switching devices (Q25a, Q25b, Q25c) so that the gate control signals (G1, G2, G3) repeatedly turn on and off the switching devices (Q25a, Q25b, Q25c) in a short period. To the contrary, when turning off the power factor corrector (25) so that the power factor correction operation stops, the power factor correction driver (30) outputs gate control signals (G1, G2, G3) to the respective switching devices (Q25a, Q25b, Q25c) so that the gate control signals (G1, G2, G3) leave all the switching devices (Q25a, Q25b, Q25c) off.

—Controller—

The controller (31) includes a memory and a central processing unit (CPU). Depending on various programs stored in the memory, the controller (31) functions as the above units as illustrated in FIG. 3: namely, the input voltage sampler (31a), the PFC current calculator (31b); the output voltage sampler (31c); and the input current calculator (31d). Moreover, the controller (31) functions as a motor driving controller (31e).

The motor driving controller (31e) deter mines the motor control signal (Pwm) based on rotor position information on the motor (11), and outputs the determined motor control signal (Pwm) to the inverter driver of the power converter (28). The rotor position information includes, for example, the result of detection by the hall effect sensor in the motor (11), and the input current (Im) that is the result of detection by the current detector (29). Moreover, while the motor (11) is driving, the motor driving controller (31e) performs feedback control on the drive of the motor (11) using, for example, the rotor position information and a result of detection at a moment (Vac_peak, Vdc) by each of the detectors (24, 27).

Furthermore, the controller (31) according to this first embodiment performs control for the power factor corrector (25). The control includes: variable control of an output target value (Vdc_ref) indicating a target value of an output voltage (Vdc) to be output by the power factor corrector (25); and on-off control of the power factor corrector (25).

Figure 4:
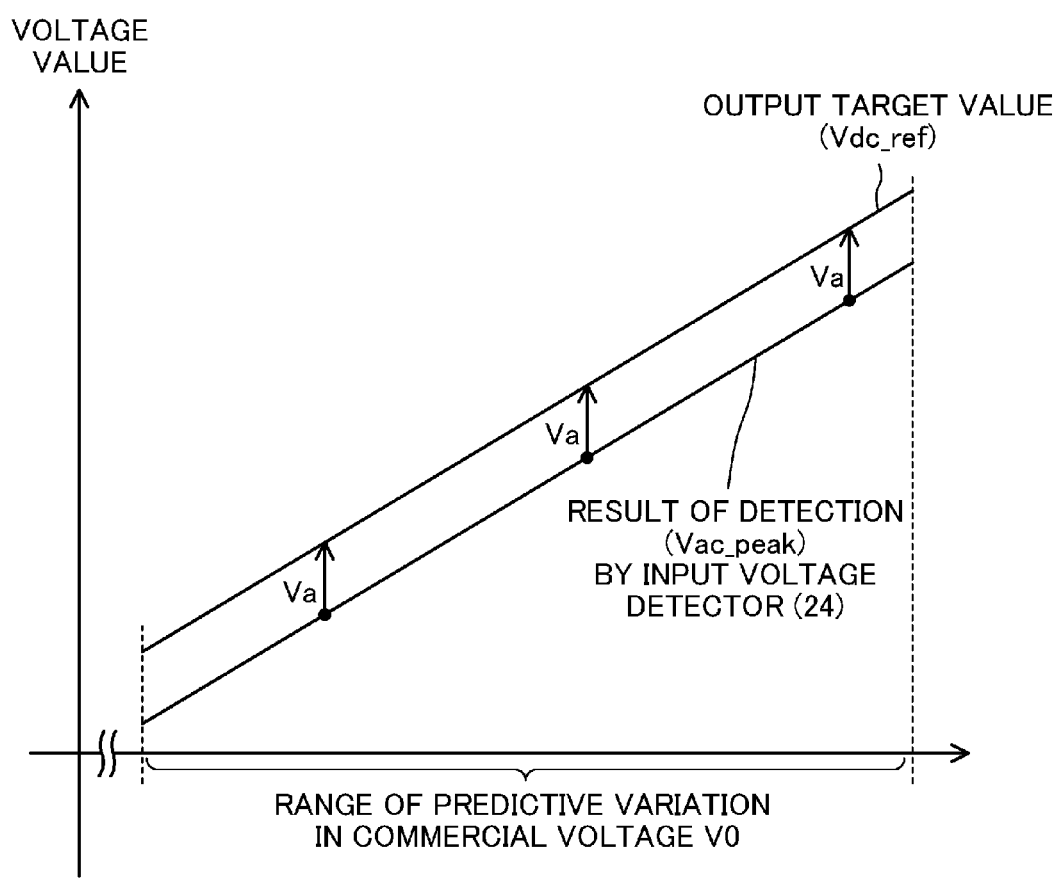
FIG. 4 is a graph conceptually illustrating a variable output target value.

The variable control of the output target value (Vdc_ref) is performed by the controller (31) functioning as a target value determiner (31f). As illustrated in FIG. 4, for example, the target value determiner (31f) determines, as the output target value (Vdc_ref), the result of adding a constant boost amount (Va) to a result of detection (Vac_peak) at each moment by the input voltage detector (24). FIG. 4 is a graph conceptually illustrating the variable output target value (Vdc_ref). Specifically, FIG. 4 shows that the output voltage (Vdc) from the power factor corrector (25) varies depending on the input voltage (V1). Hence, the boost amount (Va) of the power factor corrector (25) remains unchanged even though the power supply voltage variation—the variation in the commercial voltage (V0)—might have occurred. Thus, the currents flowing through the switching devices (Q25a, Q25b, Q25c) remain approximately constant, and so does the power loss of the reactors (L25a, L25b, L25c) and the switching devices (Q25a, Q25b, Q25c).

<On-Off Control of Power Factor Corrector>

The on-off control of the power factor corrector (25) is performed by the controller (31) functioning as a power factor correction controller (31g) (equivalent to a control unit). The power factor correction controller (31g) controls turn-on and turn-off of the power factor corrector (25), based on the input current (Im).

Note that FIG. 5, to which reference is made for the description below, is an illustration showing a mechanism to cause hunting. FIG. 6 is a timing diagram illustrating temporal changes in: the input current (Im); time point for detecting the input current (Im) by the current detector (29); and the PFC drive instruction signal (Cpfc).

Figure 5:
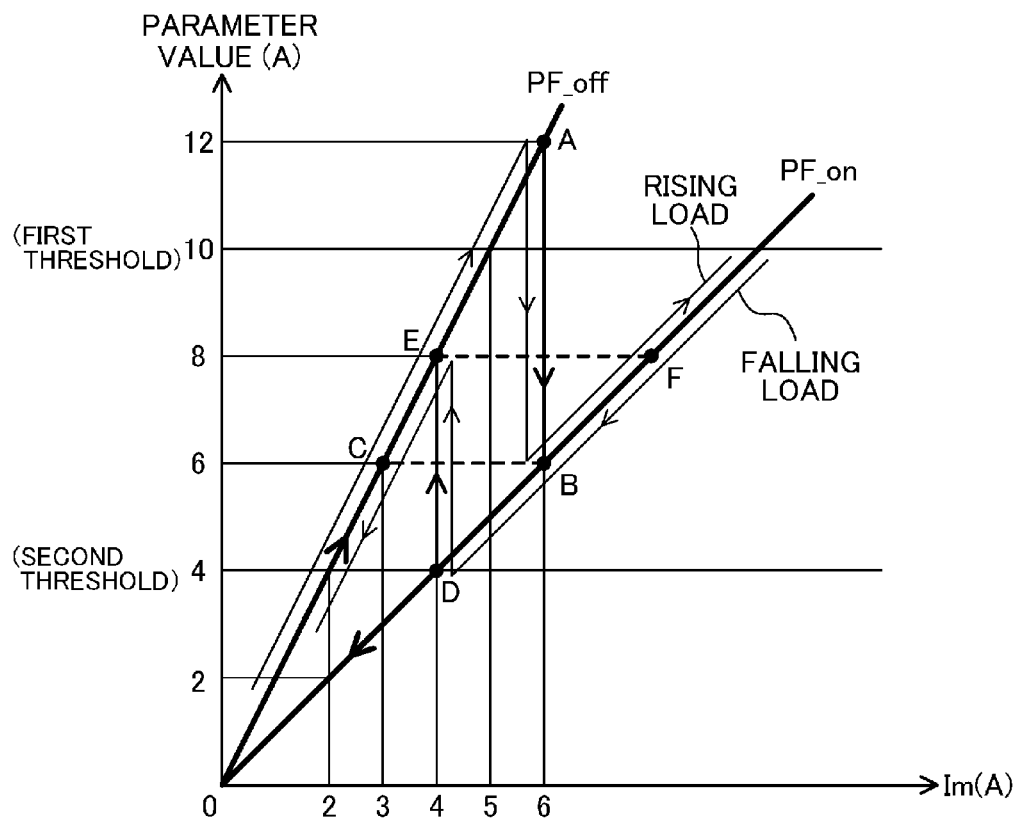
FIG. 5 illustrates a mechanism to cause hunting.
Figure 6:
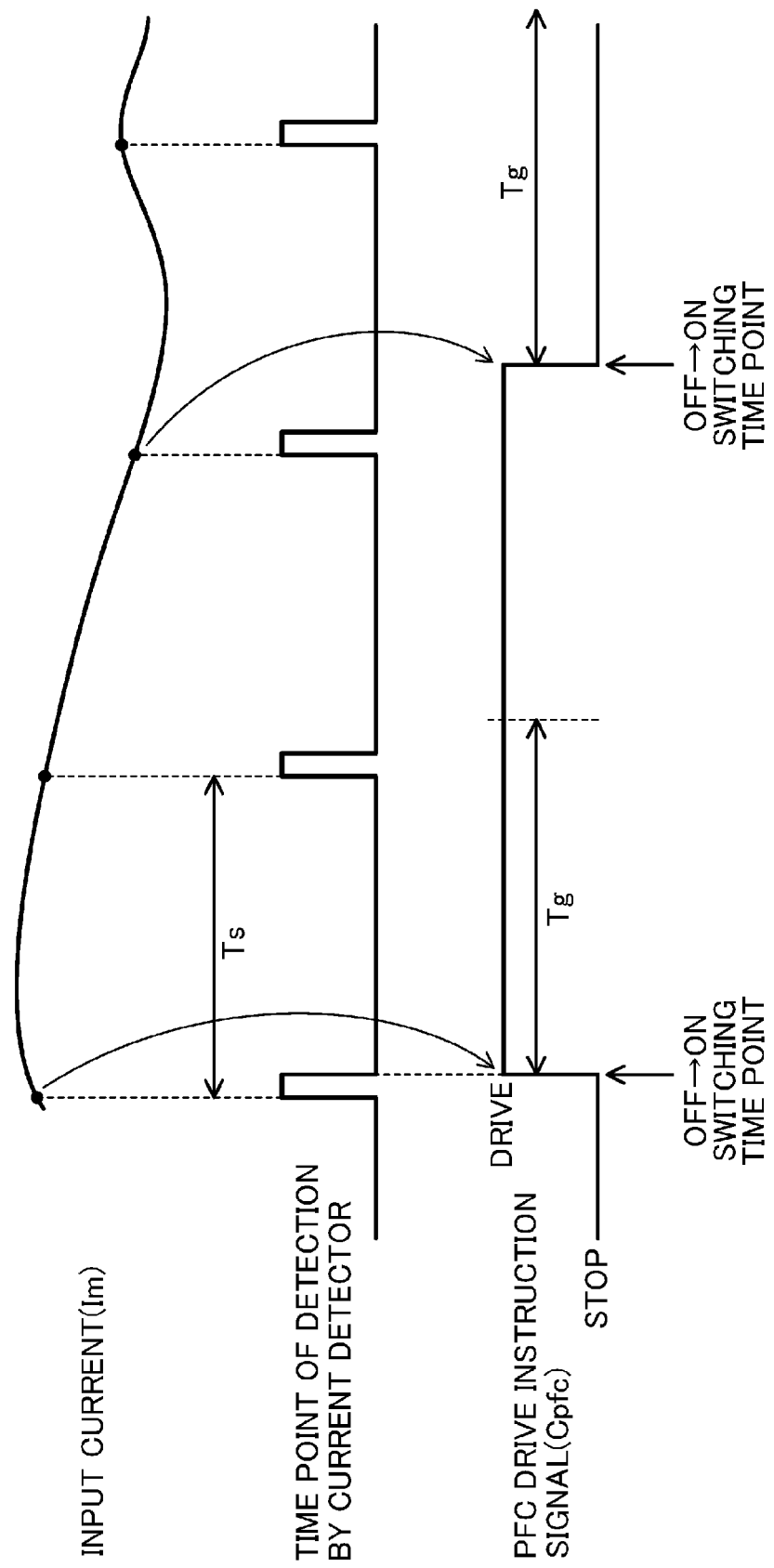
FIG. 6 is a timing diagram illustrating temporal changes in: input current; time point for detecting the input current by a current detector; and PFC drive instruction signal.

As illustrated in FIG. 5, the power factor correction controller (31g) has an on-state current conversion expression (PF_on) and an off-state current conversion expression (PF_off). The on-state current conversion expression (PF_on) includes a coefficient for a power factor used when the power factor corrector (25) is on, and the off-state current conversion expression (PF_off) includes a coefficient for a power factor used when the power factor corrector (25) is off. The power factor correction controller (31g) selects either the on-state current conversion expression (PF_on) or the off-state current conversion expression (PF_off), depending on whether the power factor corrector (25) is on or off. Using the selected current conversion expression (PF_on, PF_off), the power factor correction controller (31g) converts the input current (Im)—the result of detection by the current detector (29)—into a value reflecting on the power factor. The result of this conversion is referred to as "parameter value".

Then, if a parameter value given by the off-state current conversion expression (PF_off) is greater than or equal to a first threshold, the power factor correction controller (31g) turns on the power factor corrector (25) and causes the power factor corrector (25) to perform the power factor correction operation. If the parameter value given by the on-state current conversion expression (PF_on) is smaller than or equal to a second threshold below the first threshold, the power factor correction controller (31g) turns off the power factor corrector (25) and causes the power factor corrector (25) to stop the power factor correction operation. After switching on and off of the power factor corrector (25), the power factor correction controller (31g) selects either the on-state current conversion expression (PF_on) or the off-state current conversion expression (PF_off), depending on whether the switched power factor corrector (25) is on or off. Using the selected current conversion expression (PF_on, PF_off), the power factor correction controller (31g) reconverts the parameter value.

Note that the current conversion expression (PF_on, PF_off) is previously determined based on, for example, the power consumption, the input current (Im), and the input voltage (V1), of a load (i.e., the motor (11)), observed when the power factor corrector (25) is actually turned on or off.

Described here is an example, with reference to FIG. 5. The current conversion expressions (PF_on, _off) are defined by respective Expressions (1) and (2) as follows:

$$PF\_on = Im/1 \qquad (1); \text{ and}$$

$$PF\_off = Im/0.5 \qquad (2).$$

The coefficient "1" in Expression (1) represents the power factor when the power factor corrector (25) is on, and the coefficient "0.5" in Expression (2) represents the power factor when the power factor corrector (25) is off. The parameter value is obtained when the result of detection by the current detector (29) is divided by each power factor.

Suppose that the first threshold is "10A", and the second threshold is "4A".

When the power factor corrector (25) is in the off state, the actual input current (Im) flowing through the GND line (42) continues rising as the arrow "rising load" in FIG. 5 indicates, for example. If the result of detection by the current detector (29) is "6A" in this state, the parameter value given by Expression (2) is "12A" which is greater than or equal to the first threshold (i.e., the point A in FIG. 5). Thus, the power factor correction controller (31g) turns on the power factor corrector (25). Selected next is the on-state current conversion expression (PF on) in Expression (1), and the reconverted parameter value is "6A" (i.e., the point B in FIG. 5).

Moreover, when the power factor corrector (25) is in the on state, the actual input current (Im) continues falling as the arrow "falling load" in FIG. 5 indicates, for example. If the result of detection by the current detector (29) is "4A" in this state, the parameter value given by Expression (1) is "4A" which is equal to the second threshold (i.e., the point D in FIG. 5). Thus, the power factor correction controller (31g) turns off the power factor corrector (25). Selected next is the off-state current conversion expression (PF_off) in Expression (2), and the reconverted parameter value is "8A" (i.e., the point E in FIG. 5).

The first and second thresholds are determined based on, for example, a possible range of the parameter value reconverted immediately after the switching.

However, the parameter value reconverted immediately after the switching, as described above, is based on the input current (Im) immediately before the switching. Specifically, at the moment immediately after the on-off switching of the power factor corrector (25), the current detector (29) has not newly detected the input current (Im). Thus, the power factor correction controller (31g) holds the input current (Im) observed immediately before the switching. In using the reconverted parameter value, the power factor correction controller (31g) can make false recognition on the true state, of a power factor, including the latest state of the power factor corrector (25).

For example, the state of the power factor corrector (25) transits from the point A to the point B, as shown in the graph of FIG. 5. Since the parameter value "6A" at the point B is obtained based on the input current (Im) observed when the power factor corrector (25) is off in the first place, the power factor correction controller (31g) can falsely recognize the point B representing the true state as the point C; that is, the point observed when the power factor corrector (25) is off and having the same parameter value "6A". Even though having just turned on the power factor corrector (25), the power factor correction controller (31g) inevitably turns off the power factor corrector (25) again. This is because if the power factor corrector (25) is in the state of point C, the power factor correction controller (31g) performs control to leave the power factor corrector (25) off until the parameter value becomes greater than or equal to the first threshold.

In a similar manner, the state of the power factor corrector (25) transits from the point D to the point E. Since the parameter value "8A" at the point E is obtained based on the input current (Im) observed when the power factor corrector (25) is on in the first place, the power factor correction controller (31g) can falsely recognize the point F—the point observed when the power factor corrector (25) is on and having the same parameter value "8A"—as the point E representing the true state. Even though having just turned off the power factor corrector (25), the power factor correction controller (31g) inevitably turns on the power factor corrector (25) again. This is because if the power factor corrector (25) is in the state of point F, the power factor correction controller (31g) performs control to leave the power factor corrector (25) on until the parameter value becomes smaller than or equal to the second threshold.

Such operations result in the occurrence of hunting; that is, the power factor corrector (25) repeatedly turns on and off for a short period of time. The hunting causes disturbance in a waveform of the input current (Im) and abnormal noise from the reactors (L25a, L25b, L25c).

Thus, through a predetermined time period (Tg) from the moment when the power factor corrector (25) is switched either from on to off, or from off to on, the power factor correction controller (31g) according to this embodiment maintains the state of the switched power factor corrector (25), regardless of the parameter value, as illustrated in FIG. 6. After the predetermined time period (Tg) has elapsed, the power factor correction controller (31g) stops maintaining the state of the switched power factor corrector (25). Such operations enable leaving the power factor corrector (25) on for the predetermined time period (Tg), once the power factor corrector (25) is switched on, for example. As a result, the hunting may be reduced through the predetermined time period (Tg).

In particular, the predetermined time period (Tg) is set longer than a predetermined sampling period (Ts) in which the current detector (29) detects the input current (Im) (Tg>Ts). Specifically, in this embodiment, once the power factor corrector (25) is switched between on and off, the current detector (29) newly detects the input current (Im) at least once, until the next switching between on and off. One of the reasons why hunting occurs is that, when the power factor corrector (25) is switched again between on and off, used here is the result of detection, by the current detector (29), without update before or after the switching. However, this embodiment successfully avoids such a problem. Moreover, the input current (Im) detected after switching between on and off reflects the influence of a power factor variation caused by the switching. Hence, the power factor correction controller (31g) may reliably switch between the on state and off state of the power factor corrector (25) when necessary, depending on the latest input current (Im).

<Effects of First Embodiment>

In the power converter (20) according to this embodiment, when the power factor corrector (25) is switched between on and off, the on state or the off state of the switched power factor corrector (25) is maintained regardless of the parameter value through the predetermined time period (Tg) from the moment of the switching. Thus, through the predetermined time period (Tg) from the moment when the power factor corrector (25) is switched between on and off, the hunting—the power factor corrector (25) is continuously turns on and off alternately—may be reduced.

Then, after the predetermined time period (Tg) has elapsed, the power factor corrector (25) is switched between on and off, based on the magnitude relationship among the parameter value and the two thresholds (i.e., the first and second thresholds, specifically).

Furthermore, the predetermined time period (Tg) is longer than the predetermined sampling period (Ts) in which the current detector (29) detects the input current (Im). After the predetermined time period (Tg) has elapsed, such a feature enables switching the power factor corrector (25) between on and off based on a parameter value converted using the latest input current (Im) detected during the predetermined time period (Tg). Hence, after the predetermined time period (Tg) has elapsed, the power factor corrector (25) is correctly switched between on and off based on the latest parameter value, and the occurrence of the hunting after the predetermined time period (Tg) has elapsed is reliably reduced.

<<Other Embodiments>>

The first embodiment may be implemented in the manners below.

The power factor correction controller (31g) may perform the on-off control of the power factor corrector (25) based on input power or output power, instead of the input current (Im). The input power is the product of the input current (Im) and the input voltage (V1). Here, a detector detecting the input voltage (V1) may be provided separately from the input voltage detector (24), and the separate detector may beneficially detect the input voltage (V1) in a detection period shorter than the predetermined time period (Tg). The output power is the product of an output current from the power factor corrector (25) and the output voltage (V2) detected by the output voltage detector (27). Beneficially, the output detection period for the output voltage detector (27) may also be shorter than the predetermined time period (Tg). Then, beneficially, the input power or the output power may be converted into a value (i.e., a parameter value) reflecting on a power factor, and used for the on-off control of the power factor corrector (25). Here, specifically, the parameter value is referred to as a value for the input power or the output power.

The predetermined time period (Tg) may be a variable time period, instead of a constant time period.

The output target value (Vdc_ref) may also be a fixed value, instead of a variable value.

The power factor corrector (25) may also be a buck power factor corrector or a buck-boost power factor corrector, instead of a boost power factor corrector.

The motor (11) may also drive other units, such as the outdoor fan (76) and the indoor fan (82), than the compressor (72).

The input voltage detector (24) may also sample values such as an effective value and an average value of the commercial voltage (V0) or the input voltage (V1), instead of the peak amplitude (V11) of the input voltage (V1), for the input detection period.

A separate rectifying circuit from the rectifier (22) may be connected to the commercial power source (91), and the input voltage detector (24) may detect a voltage output from the rectifying circuit.

INDUSTRIAL APPLICABILITY

As can be seen, the present invention is useful for a power converter including a power factor corrector.

DESCRIPTION OF REFERENCE CHARACTERS

20 Power Converter
22 Rectifier
25 Power Factor Corrector
28 Power Converter
29 Current Detector (Detector)
31g Power Factor Correction Controller (Controller)
91 AC Power Source (Commercial Power Source)
70 Air Conditioner
V1 Input Voltage
Im Input Current
Ts Predetermined Sampling Period (Predetermined Period)
Tg Predetermined Time Period

The invention claimed is:

1. A power converter comprising:
a rectifier configured to rectify an input alternate current from an AC power source;
a power factor corrector configured to perform a power factor correction operation on an input voltage output from the rectifier;
a power converter connected to an output of the power factor corrector, and configured to generate output AC power; and
a controller configured to control the power factor correction operation by the power factor corrector and
a detector configured to detect input current flowing into the power factor corrector for a predetermined period, wherein
the controller is configured to turn on the power factor corrector and cause the power factor corrector to perform the power factor correction operation if a parameter value, which is calculated by the controller from the detected input current flowing into the power factor corrector, is greater than or equal to a first threshold, and turn off the power factor corrector and cause the power factor corrector to stop the power factor correction operation if the parameter value is smaller than or equal to a second threshold below the first threshold; and through a predetermined time period from a moment when the power factor corrector is switched either from on to off, or from off to on, the controller is configured to maintain a state of the switched power factor corrector regardless of the parameter value, the controller is configured to stop maintaining the state of the switched power factor corrector after the predetermined time period has elapsed, and the predetermined time period is longer than the predetermined period.

2. An air conditioner comprising the power converter of claim 1.

3. The power converter of claim 1, wherein
the parameter value is a value corresponding to input power into or output power from the power factor corrector.

4. An air conditioner comprising the power converter of claim 3.

5. A power converter comprising:
a rectifier configured to rectify an input alternative current (AC) from an AC power source;
a power factor corrector configured to perform a power factor correction operation on an input voltage output from the rectifier;
a power converter connected to an output of the power factor corrector, and configured to generate output AC power;
a controller configured to control the power factor correction operation by the power factor corrector;
a current detector configured to detect an input current flowing into the power factor corrector for a predetermined period; and
a voltage detector configured to detect the input voltage output from the rectifier for the predetermined period, wherein
the controller is configured to calculate a product of the detected input current and the detected input voltage to obtain a parameter value,
the controller is configured to turn on the power factor corrector and cause the power factor corrector to perform the power factor correction operation if the parameter value is greater than or equal to a first threshold, and turn off the power factor corrector and cause the power factor corrector to stop the power factor correction operation if the parameter value is smaller than or equal to a second threshold below the first threshold, through a predetermined time period from a moment when the power factor corrector is switched either from on to off, or from off to on, the controller is configured to maintain a state of the switched power factor corrector regardless of the parameter value, the controller is configured to stop maintaining the state of the switched power factor corrector after the predetermined time period has elapsed, and the predetermined time period is longer than the predetermined period.

6. An air conditioner comprising the power converter of claim 5.

7. A power converter comprising:
a rectifier configured to rectify an input alternate current (AC) from an AC power source;
a power factor corrector configured to perform a power factor correction operation on an input voltage output from the rectifier;
a power converter connected to an output of the power factor corrector, and configured to generate output AC power;
a controller configured to control the power factor correction operation by the power factor corrector;
a current detector configured to detect an output current flowing out of the power factor corrector for a predetermined period; and
a voltage detector configured to detect an output voltage of the power factor corrector from the predetermined period, wherein
the controller is configured to calculate a product of the detected output current and the detected output voltage to obtain a parameter value,
the controller is configured to turn on the power factor corrector and cause the power factor corrector to perform the power factor correction operation if the parameter value is greater than or equal to a first threshold, and turn off the power factor corrector and cause the power factor corrector to stop the power factor correction operation if the parameter value is smaller than or equal to a second threshold below the first threshold, through a predetermined time period from a moment when the power factor corrector is switched either from on to off, or from off to on, the controller is configured to maintain a state of the switched power factor corrector regardless of the parameter value, the controller is configured to stop maintaining the state of the switched power factor corrector after the predetermined time period has elapsed, and the predetermined time period is longer than the predetermined period.

8. An air conditioner comprising the power converter of claim 7.

* * * * *